9-455

0/7/86 X3 RE 32,258

United States Patent [19]

Kondo et al.

[11] E Patent Number: Re. 32,258

[45] Reissued Date of Patent: Oct. 7, 1986

[54] METHOD OF FILLING A CASING WITH HEAT INSULATING FIBERS

[75] Inventors: Katsumi Kondo; Fumiyoski Noda; Mikio Murachi; Yuji Watanabe; Masaru Usui, all of Toyota, Japan

[73] Assignee: Toyota Jidosha Kabushiki Kaisha, Toyota, Japan

[21] Appl. No.: 623,398

[22] Filed: Jun. 22, 1984

Related U.S. Patent Documents

Reissue of:

[64] Patent No.: 3,921,273
Issued: Nov. 25, 1975
Appl. No.: 512,872
Filed: Oct. 7, 1974

[30] Foreign Application Priority Data

Oct. 9, 1973 [JP] Japan ..... 48-113457

[51] Int. Cl.[4] ..... B21D 53/00; B21K 29/00; B23P 15/26

[52] U.S. Cl. ..... 29/157 R; 29/235; 29/423; 29/451; 29/455 R

[58] Field of Search ..... 29/451, 235, 157 R, 29/421 R, 423, 455 R; 53/432; 181/240

[56] References Cited

U.S. PATENT DOCUMENTS

| | | | |
|---|---|---|---|
| 3,012,315 | 12/1961 | Stillwagon, Jr. | 29/423 |
| 3,035,331 | 5/1962 | Wieman | 29/451 |
| 3,137,148 | 6/1964 | Kayser | 29/450 UX |
| 3,222,777 | 12/1965 | Rutter | 29/157 R X |
| 3,458,966 | 8/1969 | Dunbar et al. | 29/451 UX |
| 3,768,260 | 10/1973 | Glenn | 181/240 X |

*Primary Examiner*—Charlie T. Moon
*Attorney, Agent, or Firm*—Quaintance, Murphy & Presta

[57] ABSTRACT

Method of filling a casing with heat insulating fibers in which a fibrous heat insulating mass of fixed size is inserted into a space to be filled by vacuum-packing the fibrous mass in a vacuum-resistant bag, which may then be wrapped about an inner cylinder, introducing the bag into an outer cylinder and, after breaking the vacuum seal, allowing the fibrous mass to swell and fill any space within the outer cylinder not occupied by said inner cylinder, if any.

14 Claims, 16 Drawing Figures

THE THICKNESS OF 12.5mm THICK CERAMIC FIBER BLANKETS WITH VARIOUS DENSITIES AFTER VACUUM PACKING UNDER VARIOUS VACUUM PRESSURES

THE THICKNESS OF VACUUM PACKED 12.5mm THICK CERAMIC FIBER BLAKETS WITH VARIOUS DENSITIES AFTER THE VACUUM IS RELEASED

THE THICKNESS OF VACUUM PACKED 25mm THICK CERAMIK FIBER BLANKETS WITH VARIOUS DENSITIES AFTER THE VACUUM IS RELEASED

THE THERMAL CONDUCTIVITIES OF CERAMIC FIBER BLANKETS WITH VARIOUS DENSITIES

METHOD OF FILLING A CASING WITH HEAT INSULATING FIBERS

Matter enclosed in heavy brackets [ ] appears in the original patent but forms no part of this reissue specification; matter printed in italics indicates the additions made by reissue.

BACKGROUND OF THE INVENTION

Automobile exhaust gas purifers such as manifold reactors or catalytic converters should comprise a heat insulator which can withstand high temperature, because the inside of such a device has to be kept warm so that its exhaust gas purifying ability may be improved and the heat released from such a device has to be prevented from affecting adjacent parts of the automobile.

The so-called ceramic fibers, which are fibrous heat insulators for high temperature use constitute one of the materials available for this purpose. Fibers of alumina-silica can withstand a maximum working temperature of 1200°-1400° C.; one of silica can withstand 1000° C.; one of potassium titanate can withstand about 1000° C.; and one of zirconia can withstand 1800° C. Slag wool is also available, but the working temperature it can withstand is low, i.e., about 600° C.

These fibrous materials have a heat insulating ability two to three times as high as that of heat resistant, heat insulating brick; a bulk specific gravity of 0.05-0.25 g/cm$^3$, which is about $\frac{1}{8}$ of that of the heat insulating brick; and are flexible and vibration-resistant, so as to be quite free from the possibility of being broken by heat shock. Being less resistant to wind velocity, however, they usually need a heat-resistant metal plate applied on the heating surface and are sandwiched between the metal plate and the outer shell, when they are used in a manifold reactor. When they are used in a catalytic converter, they fill the space between the catalyst carrier and the outer shell. In any case, the fibrous heat insulator has to fill a very narrow space. To do this efficiently without sacrificing performance, various methods have been worked out. To give some examples, there are:

1. The method of inserting a bulky heat insulator through the end of the space between the heat insulating inner cylinder and outer cylinder;
2. The method of introducing into the outer cylinder an inner cylinder wrapped with a felt-like heat insulator, or sheathing the inner cylinder with an outer cylinder split into two parts; and
3. The method of inserting a stainless steel, foil-packed fibrous heat insulator. There are, however, many drawbacks in these methods. For example:
   1. The efficiency is poor;
   2. The fill density becomes uneven; and
   3. It is expensive.

SUMMARY OF THE INVENTION

The present invention provides a method of filling a narrow heat insulating space in an exhaust gas purifier such as a manifold reactor. According to the present invention, the reactor can be filled with a fibrous heat insulator with extremely high efficiency and uniformity, thereby substantially increasing the work efficiency. Moreover, since the space can be filled to a high density with the fibrous heat insulator, its heat insulating capacity can be improved and accordingly the purifying performance of the exhaust gas purifier can be increased, while the amount of heat released can be decreased.

DETAILED DESCRIPTION OF THE INVENTION

Figure 1:
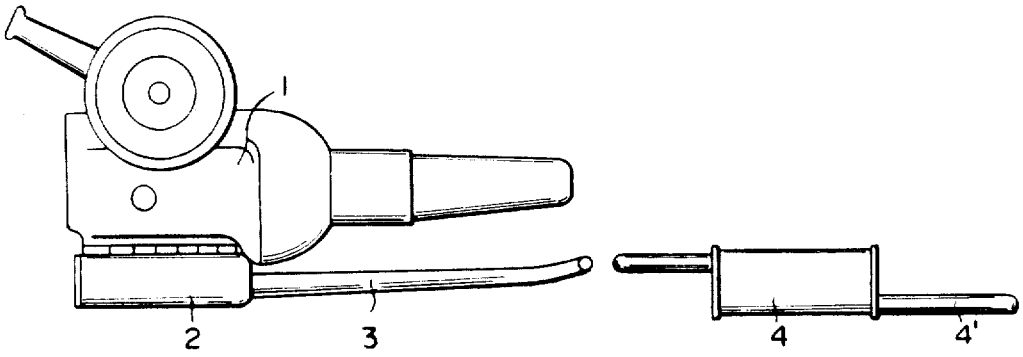
FIG. 1 shows the assembly comprising the engine, the manifold reactor, the exhaust pipe and the muffler.
Figure 2:
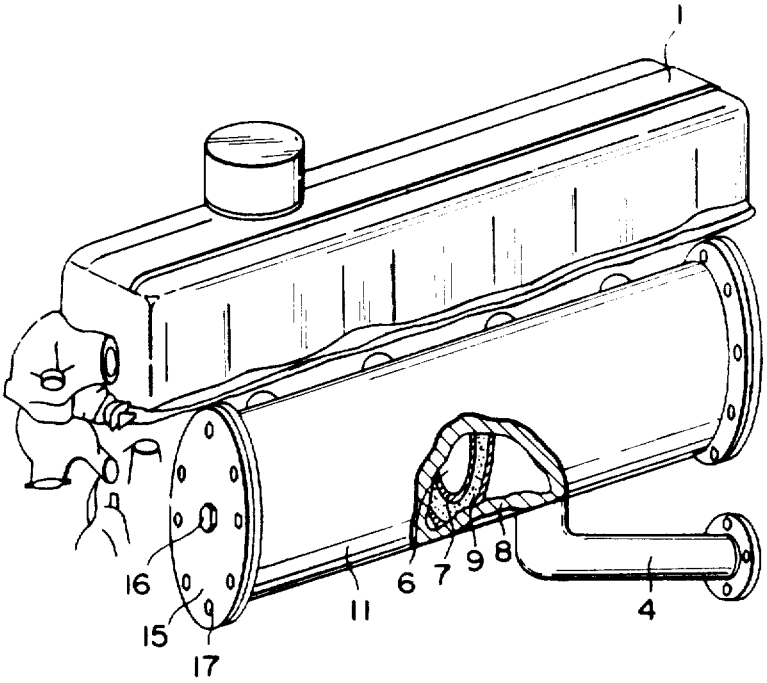
FIG. 2 is a perspective view of the manifold reactor fitted to the engine, with part of the reactor wall shown broken away.

According to the present invention, which relies on the compressibility of a fibrous heat insulating material, the fibrous heat insulating material is placed in a heat-resistant film bag; the bag is depressurized to compress and reduce the volume of the fibrous heat insulator; the heat insulating material which has been thus compressed and reduced in volume is inserted into the space to be insulated from heat; and then the vacuum seal of said bag is broken to expose its contents to atmospheric pressure, so that said insulating material expands to fill said space.

According to the present invention, the same purpose may also be attained by placing fibrous heat insulating material, which has been cut to the size of a space to be filled, into a vacuum-resistant film bag; vacuum-packing the resulting assembly; inserting it into the space to be filled; and then breaking the seal of the package. In the case of a manifold reactor or a catalytic converter having an intricate configuration of inner and outer cylinders, unlike the case of an ordinary heat insulated pipe in which a heat insulator is introduced between outer and inner cylinders having smooth surfaces, it would be advisable to apply a laminated layer of the fibrous heat insulating material on the surface of the inner cylinder, insert the whole inner cylinder into a film bag which is then hermetically sealed for vacuum-packing; and then break the seal of the vacuum-package after having introduced it into the outer cylinder.

As understood from the above, the hermetically sealed bag to be used in the present invention should desirably be flexible and for this purpose the flexible plastic film should be one that does not break when vacuum-packed. For instance, nylon, polyethylene, polypropylene films, etc. may be usd singly or as a laminated sheet. Preferably, the film should vanish when burned.

In addition to the above-mentioned ceramic fiber as fibrous heat insulator, anything fibrous with elasticity may be used for the present invention.

Tables 1–3 give the characteristic values of a few examples of the fibrous heat insulator. FIGS. 9–14 show the thicknesses of these materials when they are vacuum-packed under various pressures and when their hermetic seal is broken. FIG. 15 shows the thermal conductivities of ceramic fiber blankets with various densities.

TABLE 1

| Characteristic values of ceramic fiber blankets | | |
|---|---|---|
| Item | | Characteristic values |
| Fiber diameter | | 2.8μ average |
| Fiber length | | 100 mm average |
| True specific gravity | | 2.56 |
| Melting point | | 1760° C. |
| Chemical Composition | $Al_2O_3$ | 50.1% |
| | $SiO_2$ | 49.1% |
| | $Fe_2O_3$ | 0.2% |
| | $TiO_2$ | 0.2% |
| | CaO | 0.1% |
| | MgO | Trace |
| | $Na_2O$ | 0.3% |

TABLE 2

| Characteristic value of rock wool* | | |
|---|---|---|
| Items | | Characteristic values |
| Fiber diameter | | 4–6μ |
| Density | | 0.11–0.15 g/cm$^2$ |
| Particle-content | | less than 3% |
| Working temperature range | | −200–800° C. |
| Chemical Composition | $SiO_2$ | 35–45% |
| | $Al_2O_3$ | 10–15% |
| | CaO | 30–40% |
| | MgO | 5–7% |

*S-fiber produced by Shin-Nihon Seitebu Kagaku

TABLE 3

| Characteristic values of silica fiber* | | |
|---|---|---|
| Items | | Characteristic values |
| Fiber diameter | | 1.3μ average |
| Fiber length | | 20 mm average |
| True specific gravity | | 2.5% |
| Melting point | | 1713° C. |
| Chemical Composition | $SiO_2$ | 98% |
| | $Na_2O$ | 0.3% |
| | Others | 1.7% |

*product of Nibor Glass Fiber Co.

Figure 9:
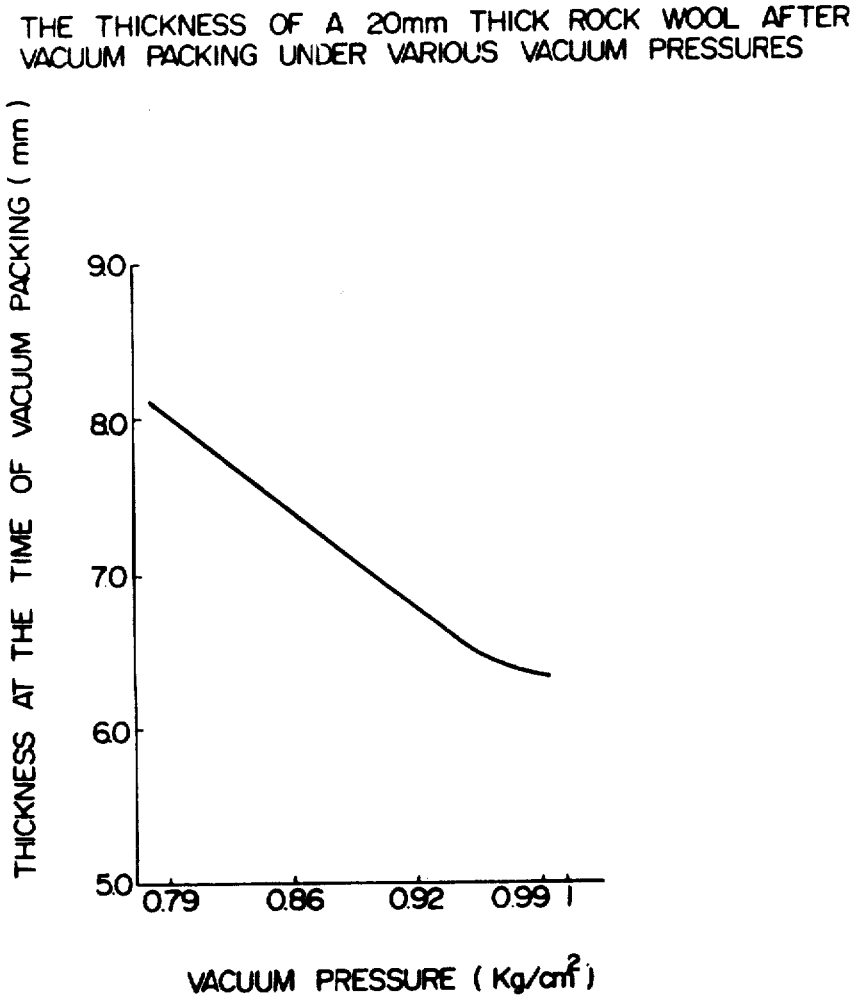
FIGS. 9-14 are diagrams showing the thickness of a heat insulator when it is vacuum-packed and when the vacuum seal is broken.
Figure 10:
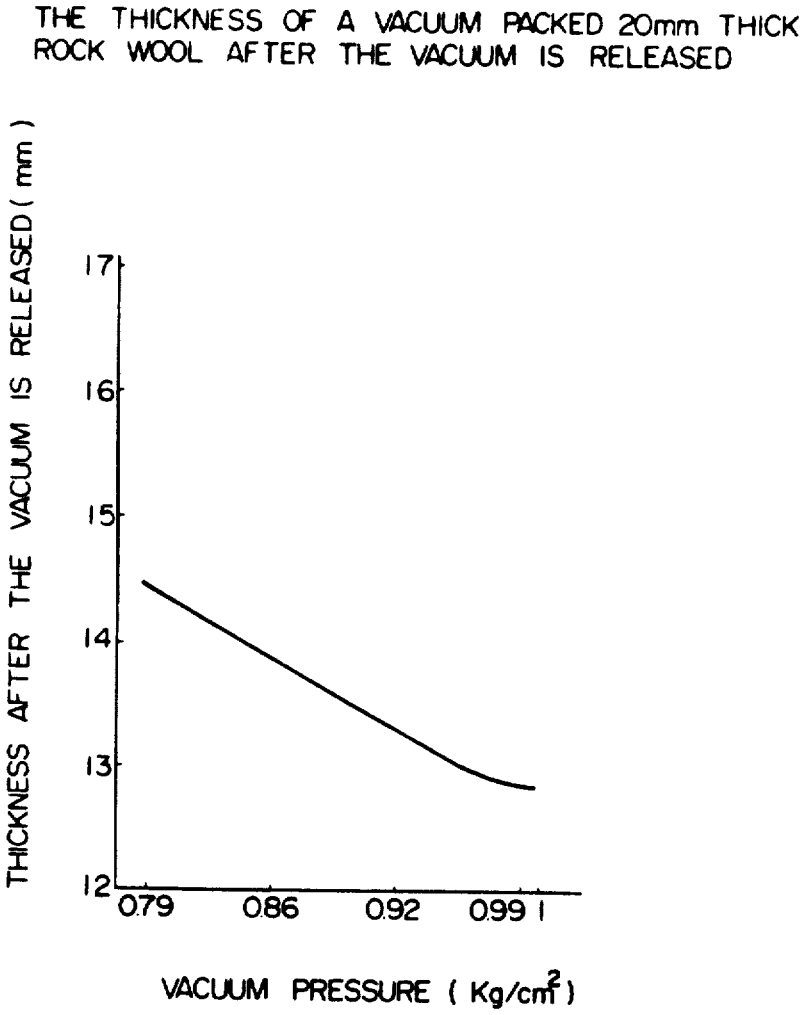

FIG. 9 illustrates the thickness of a rock wool mass, initially measuring 20 mm thick, 100 mm wide and 100 mm long, after vacuum-packing under various vacuum pressures. As seen therefrom, the thickness of the rock wool is reduced to about ⅓ of its initial value. The term "vacuum pressure" as used here means the difference between atmospheric pressure and the pressure attained after the maximum depressurization. As shown in FIG. 10, when the hermetic seal is broken, the thickness of the mass is restored at most to about twice the thickness when vacuum-packed. The vacuum-resistant film used was a 50μ thick polyethylene film laminated to a 15μ thick nylon film. The same film was used in all other cases.

Figure 11:
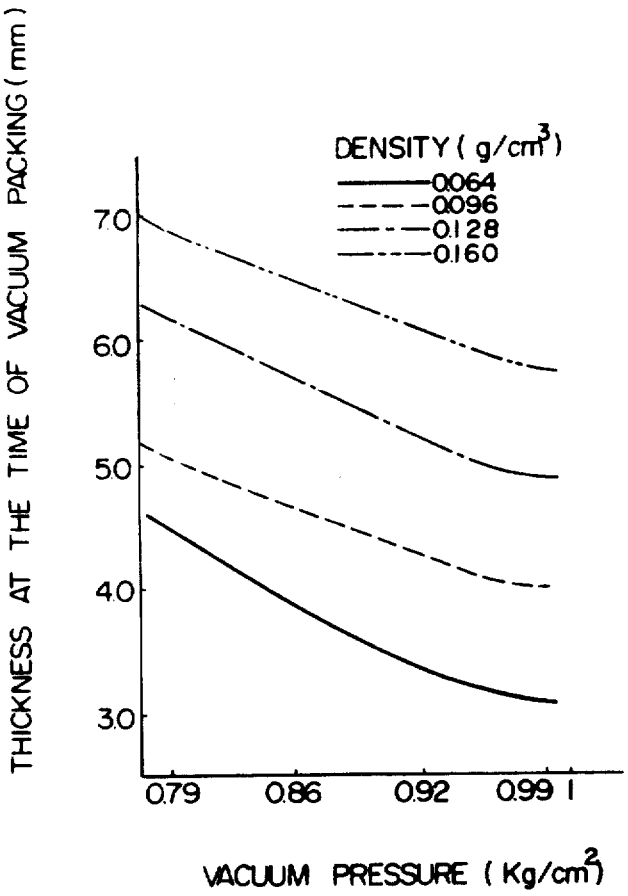

FIG. 11 illustrates the thicknesses of ceramic fiber blankets (as listed in Table 1) with various densities measuring 12.5 mm thick, 100 mm wide and 100 mm long, after vacuum-packing under various vacuum pressures.

Figure 12:
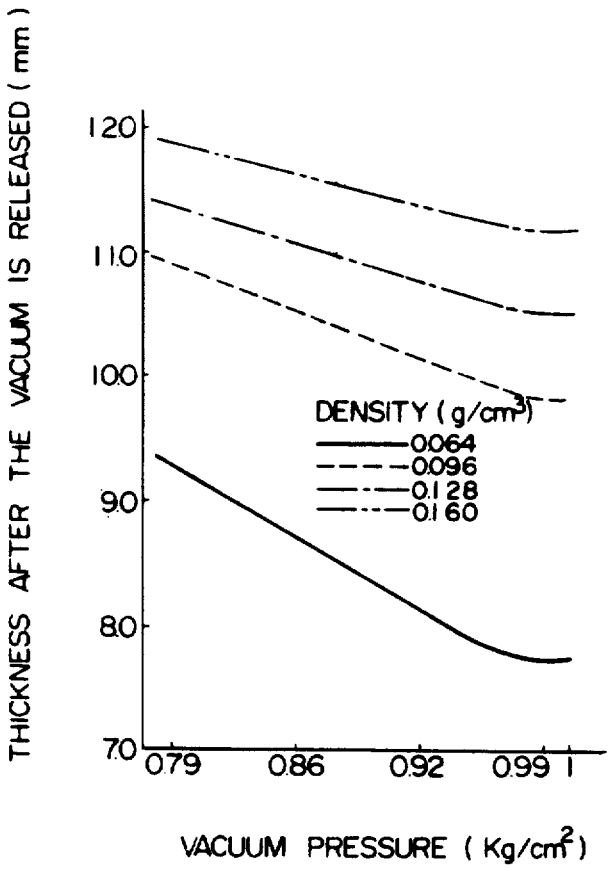

FIG. 12 illustrates the thicknesses of those blankets in FIG. 11 after the hermetic seal is broken. As seen from FIG. 11, vacuum-packing reduces the thickness of the ceramic fiber blanket to as little as ¼ of the initial value; when the hermetic seal is broken, a substantial increase from the vacuum-packed thickness takes place as indicated in FIG. 12.

Figure 13:
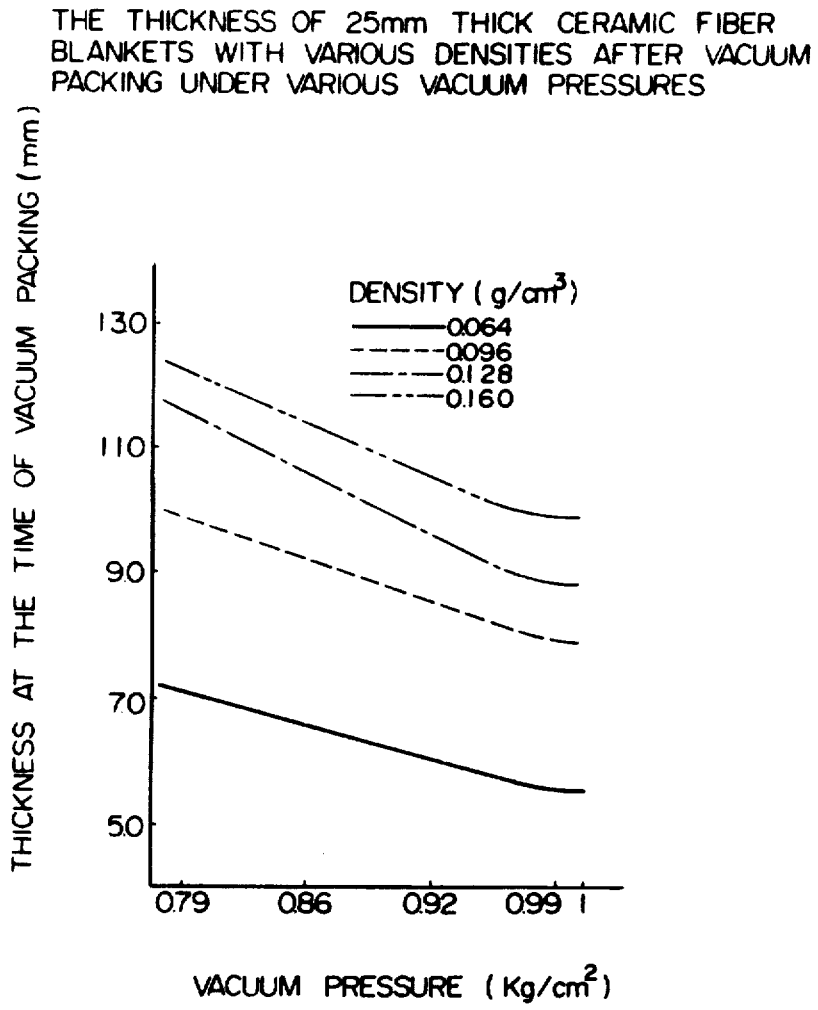
Figure 14:
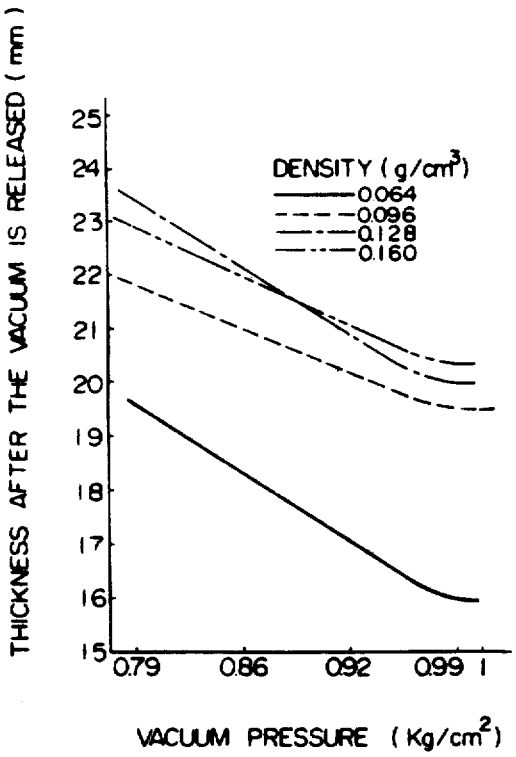
Figure 15:
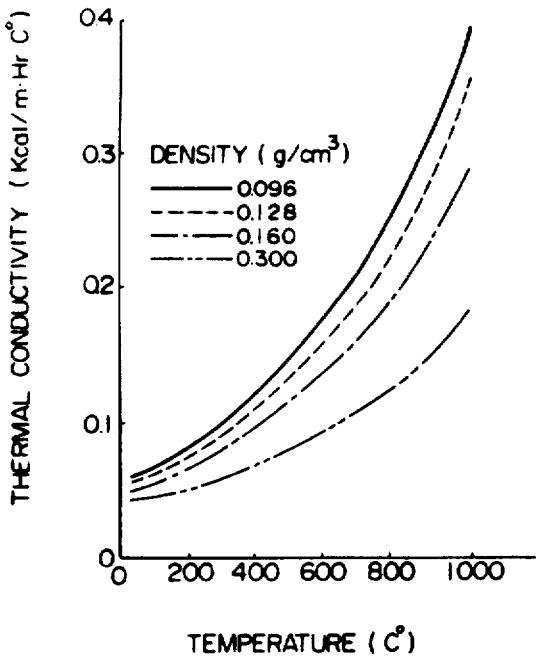
FIG. 15 is a diagram showing the thermal conductivities of ceramic fiber blankets with various densities.

FIGS. 13 and 14 respectively show the vacuum-packed thickness and the vacuum-broken thickness of the ceramic fiber blankets in FIGS. 11 and 12 when they are initially made 25 mm thick.

As described above, the fibrous heat insulator can be compressed to a fraction of its original thickness by vacuum-packing. When the vacuum pressure is 1 kg/cm$^2$, the compressive pressure rises to a maximum, i.e., 1 kg/cm$^2$.

A vacuum-packed fibrous heat insulator, when the vacuum has been broken, swells from several tens to one hundred percent in the direction of its thickness. Therefore, when the vacuum of a vacuum-packed heat insulator that can swell to twice its vacuum-packed thickness is within a space 1.5 times the thickness of the insulator, the insulator will swell to fill the space, and still have an extra capacity to expand. Thus with high density retained, the heat insulator will have a low thermal conductivity, an excellent insulating performance and excellent resistance to vibration, as illustrated in FIG. 15. There is another advantage, in that even when the dimensions of the inner or the outer cylinder change due to the temperature variations, the insulator can correspondingly swell, showing no great change in heat insulating performance.

Several specific embodiments of the present invention will now be described.

EXAMPLE 1

In FIGS. 1–4 showing the engine, manifold reactor, exhaust pipe and muffler reference numeral 1 indicates the engine; 2 indicates the manifold reactor in which CO and HC among the harmful emissions from the engine 1 are burned and transformed into harmless $CO_2$ and water, and 3 indicates the exhaust pipe which carries the exhaust gas out of the exhaust port of the manifold reactor 2 to the muffler 4.

In the engine 1, 1e is the combustion chamber of the engine, in which the gasoline and the air react with each other in an explosion which generates the exhaust gas. When the exhaust valve 1a opens, the exhaust gas passes out through the exhaust port 1f. Reference number 1g indicates the valve seat, 1c the water-cooled jacket for cooling the cylinder head 1b. 1d indicates an air inlet pipe through which an air pump introduces air to the exhaust port 1f to promote the re-combustion of the exhaust gas expelled through the exhaust port 1f, and 1h indicates a gasket. A mixture of the air introduced through the air pipe 1d and the exhaust gas passes into the cylindrical exhaust gas inlet 5 of the manifold reactor 2 and then enters the cylindrical combustion chamber 6. The exhaust gas which has been burned again in the combustion chamber 6 passes through the cylindrical gas outlet 19 into the exhaust pipe 3, and, with the noise muffled by the muffler 4, passes out of the tail pipe 4'.

In the above arrangement the gas temperature in the re-combustion chamber 6 reaches 900°-1000° C. In order to shield the surrounding parts from this heat, the space between the inner cylinder 7 and the outer cylinder 8 is filled with fibrous heat insulators 9, 9'. Reference numeral 10 indicates a cylindrical heat insulating duct for preventing the material of the heat insulators 9, 9' from dispersing into the exhaust gas. This duct is welded to the inner cylinder 7 and the outer cylinder 8 at the exhaust gas inlet and outlet.

The method of filling the heat insulators 9, 9' in this embodiment will now be described.

Figure 5:
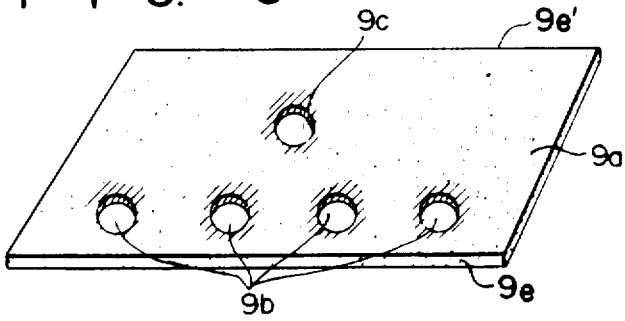
FIG. 5 is an oblique view of a heat insulator with specified portions stamped out.

A ceramic fiber blanket having the properties indicated in Table 1 (a product of Isolite Industry K.K., trade name "Kao-wool blanket," having a density of 0.128 g/cm$^2$, and a thickness of 12.5 mm) is cut into a piece of such size that it can be wrapped around the heat insulating inner cylinder 7. After cutting a hole therein for the heat insulating duct 9b of the exhaust gas inlet and for the heat insulating duct 9c of the exhaust gas outlet, a blanket 9a, as illustrated in FIG. 5 is obtained. This blanket 9a is wrapped around the inner cylinder 7 which has the side cover 7' of the inner cylinder and the heat insulating duct 10 welded thereto, and the end faces 9e, 9e' of the blanket are joined together and attached by means of a tape or the like. In addition, a blanket heat insulator 9' of the disk type is prepared with a hole provided therein for receiving the bolt 16 to support the inner cylinder 7 and this is pressed and fitted against the end cover 7' of the inner cylinder.

The inner cylinder 7, thus firmly wrapped in a blanket, is placed in a vacuum-resistant bag (such as the one mentioned above) and vacuum-packed under a vacuum pressure of 1 kg/cm$^2$. For this purpose, a vacuum-packer Model A-450-L produced by Furukawa Seisakusho is employed; and this machine is also used in the following examples.

Figure 7:
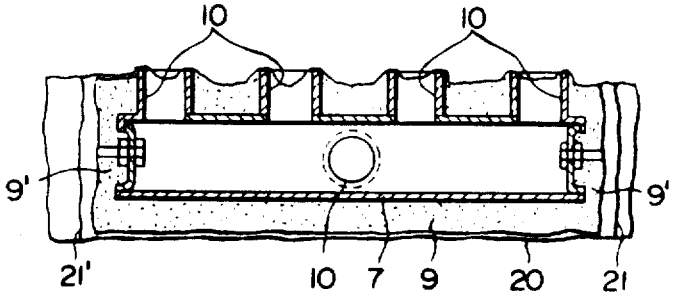
FIG. 7 is a partial sectional view taken through a vacuum-packed heat insulating inner cylinder attached to a heat insulator.

FIG. 7 illustrates the reactor in a vacuum-packed state. In FIG. 7, reference numeral 20 is a vacuum-resistant bag, 21 is the hermetic seal, and 21' is the sealed bottom of the bag. As a result of such a vacuum-sealing, the thickness of the heat insulating layer can be reduced to 4.9 mm, including the thickness of said vacuum-resistant bag.

Figure 8:
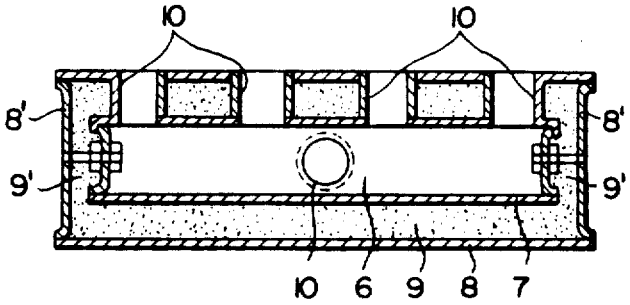
FIG. 8 is a sectional view of a heat insulating cylinder accessory.

The vacuum-packed product illustrated in FIG. 7 is introduced into the outer cylinder 8 and heated at 500° C. for 30 minutes to burn away the vacuum-resistant bag. Thus released from vacuum, the blanket swells and uniformly fills the 8 mm gap between the inner and outer cylinders 7, 8. Then the heat insulating duct 10 and the heat insulating outer cylinder 8 are welded together, and the end cover 8' is welded to the outer cylinder 8, thereby completing the heat insulating cylinder accessory (FIG. 8). The blanket 9' may be inserted in a conventional way before the end cover 8' is welded to the outer cylinder 8.

The heat insulating cylinder accessory constructed in this manner is inserted into the outer cylinder 11; the end cover 15 and gasket 18 are attached; the support bolt 16 for the inner cylinder 7 is inserted and the end cover 15 is bolted by the bolt 17 to the outer cylinder 11.

Figure 3:
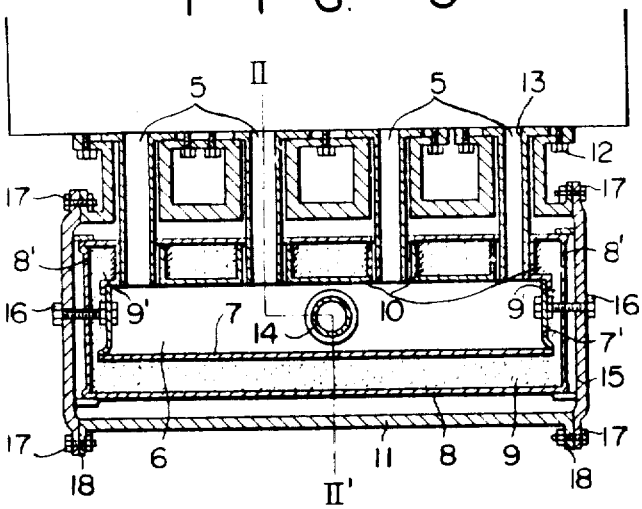
FIG. 3 is a longitudinal sectional view taken through the manifold reactor.
Figure 4:
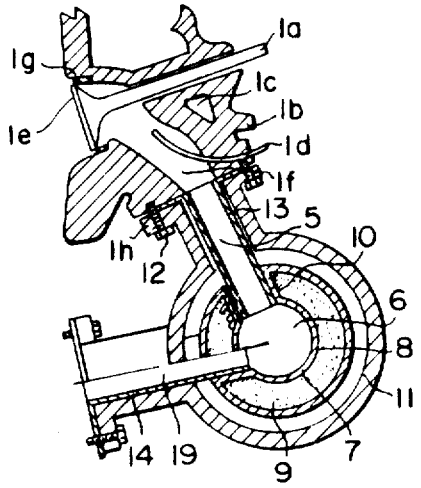
FIG. 4 is a sectional view taken along the line II—II' of FIG. 3.

Thereafter the manifold reactor is completed by providing the ducts 13, 14 (see FIG. 3). This reactor is then bolted to the engine by means of the bolt 12.

Among the components of the manifold reactor, the inner cylinder 7, the outer cylinder 8, the ducts 13, 14 and the bolt 16 are made of stainless steel. JIS-SUS-310S; the bolt 12 is made of stainless steel JIS-SUS-304: and the outer shell 11 and the end cover 15 are made of cast iron (FCG-23).

EXAMPLE 2

The same ceramic fiber blanket as in Example 1 is used and by subjecting it to the same treatment as in Example 1, a blanket 9a (FIG. 5) to be wrapped around the inner cylinder 7 is prepared.

Figure 6:
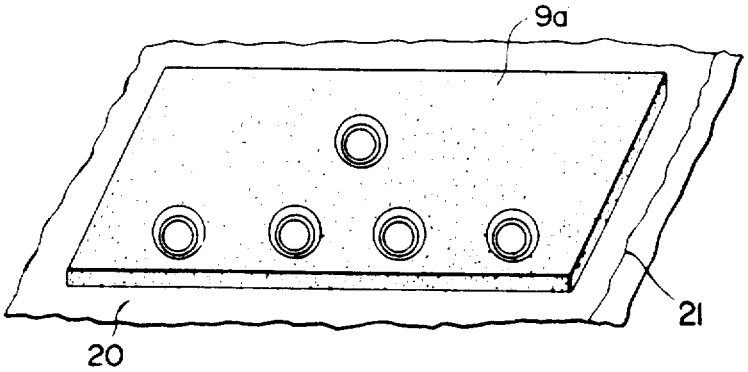
FIG. 6 is an oblique view of the heat insulator of FIG. 5 as vacuum-packed.

This blanket 9a is placed in a vacuum-resistant bag 20 (the same as above) of polyethylene laminated to nylon, and is vacuum-packed. The vacuum-packed product has its parts corresponding to the heat insulating ducts 9b, 9c for inlet and outlet of the exhaust gas in the blanket 9a heat-sealed; and with openings for receiving the heat insulating ducts stamped out, a vacuum-package as illustrated in FIG. 6 is obtained.

This vacuum-package is wrapped around the inner cylinder 7, fastened with a tape or the like and inserted into the outer cylinder 8, after which it is treated as in Example 1, thereby making a heat insulating cylinder accessory and completing a manifold reactor.

In this embodiment the heat insulator 9' to fill the end of the heat insulating cylinder may be vacuum-packed before insertion just as in Example 1, or it may be inserted in a conventional way.

In the present example, in which only the blanket is vacuum-packed, its original thickness of 12.5 mm can be reduced to 4.5 mm, including the thickness of the bag, which is thinner than in Example 1.

A heat insulating cylinder accessory prepared as in Examples 1 and 2 was compared in a vibration test with a heat insulating cylinder accessory prepared by inserting a 7 mm thick ceramic fiber blanket of the same quality as in Example 1 by a conventional method. The test conditions were as described below, and after the test, each accessory was cut open for investigation. The results shown that the products of Examples 1 and 2 were uniformly filled, but the conventional product had its blanket loosened, bulky and bent toward the bottom of the accessory.

| Test conditions | |
|---|---|
| Frequency: | 90 Hz |
| Vibrational acceleration: | 45 G |
| Amplitude: | about 2 runs |
| Test time: | 5 hours |
| Test apparatus | electromagnetic vibrators tester |
| Vibrational directions: | normal to the diameter of heat insulating cylinder and up and down |

EXAMPLE 3

Figure 16:
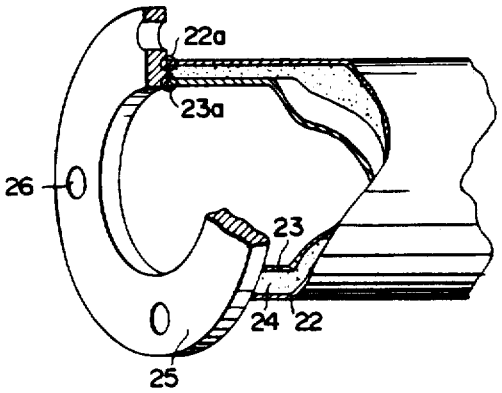
FIG. 16 is a partially fragmented oblique view of a heat insulated exhaust pipe.

In this example, a method of filling a heat insulated exhaust pipe is described, a partially cut away oblique view thereof being shown in FIG. 16, with a heat insulator. In FIG. 16, reference numeral 22 indicates an outer cylinder made of JIS-STKM-11 steel. 23 an inner cylinder made of JIS-SUS-304 steel, and 25 a flange made of JIS-SUS-304 steel, while 26 indicates the bolt hole.

First, a rock wool pad, 0.14 g/cm$^2$ in density and 20 mm in thickness (a product of Shin-Nippon Seitetsu Kagaku, see Table 2) is wrapped around the inner cylinder 23, which has a flange 25 welded thereto at 23a; the butt joint is firmly taped; and the resulting assembly is inserted into a heat resistant film bag (the same type as in Example 1). It is then vacuum-packed to a vacuum pressure of 1 kg/cm$^2$. Vacuum-packing reduces the thickness of the wool pad to 6.4 mm.

Next the resulting vacuum-package is introduced into the outer cylinder 22, and heated at 500° C. for 20 minutes to burn away the vacuum-resistant film bag. Thus released from the vacuum, the heat insulator 24 fills the space between the inner and outer cylinders.

The outer diameter of the inner cylinder is 40 mm, the inner diameter of the outer cylinder is 56 mm, and the thickness of the heat insulating space between the two cylinders is 8 mm.

EXAMPLE 4

A 25 mm thick rock wool pad of the same quality as in Example 3 is used as the heat insulator. A layer of this wool is cut into a piece of specified size, which is inserted into a vacuum-resistant bag (of the same type as above) and vacuum-packed, to a vacuum pressure 1 kg/cm$^2$. Thus vacuum-packed, the thickness, including that of the bag, can be reduced to 6.5 mm.

Next the resulting vacuum-package is wrapped around the inner cylinder 23 having the flange 25 welded thereto, the butt joint is firmly taped, the inner cylinder 23 thus treated is introduced into the outer cylinder and heated at 500° C. for 30 minutes to burn away the vacuum-resistant bag. Thus released from vacuum, the space between the two cylinders is filled with the heat insulator, thereby producing a heat insulated exhaust pipe.

In the conventional practice of wrapping the heat insulator around the surface of the inner cylinder and simply forcing the inner cylinder into the outer one, a heat insulator about 4 mm thick at the most is available for the manufacture of the above-mentioned heat insulated exhaust pipe. Thus in comparison between the products of Examples 3, 4 and the conventional product in a vibration test (the conditions being the same as above), the conventional product was found to be extremely one-sided, resulting in a heavy drop in its heat insulating effect, whereas the products according to the present invention were free from such a defect.

As described above, the present invention makes the filling of the heat insulator easy so that the fibrous heat insulator can be filled to such high density that the filled layer can exhibit excellent anti-vibration characteristics and heat insulating properties. Moreover, the present invention eliminates the sanitary problem of fine particles of the fibrous heat insulator becoming scattered into the air at the work site, and many other benefits accrue from the present invention.

What is claimed is:

[1. Method of manufacturing a heat insulator which comprises the steps of introducing between an outer casing and an inner casing an insert comprising a mass of fibrous material which has been compressed by vacuum-packing it in a hermetically sealed bag, and then unsealing said bag to permit said material to expand within said casing.]

2. Method [as claimed in claim 1] *of manufacturing a heat insulator* which comprises the [step] *steps* of [first] wrapping [said] *a hermetically* sealed bag [containing said mass of fibrous material] about an inner casing to form [the] *an* insert [introduced into said outer casing], *said sealed bag containing a mass of fibrous material which has been compressed by vacuum-packing said fibrous material in the sealed bag; and then introducing said insert into an outer casing; and then unsealing said bag to permit said fibrous material to expand between the inner casing and the outer casing; wherein the fibrous material is caused to fill the space between inner and outer cylindrical casing encircling a passage for the gas exhausted from an automotive engine.*

[3. Method as claimed in claim 1 which said bag is sealed in such a way that it may be unsealed by the application of an amount of heat insufficient to damage said fibrous mass and casing, and comprising the step of applying said amount of heat to said insulator after said bag has been introduced into said casing.]

[4. Method as claimed in claim 1 in which said bag is made of a material which is destroyed by the application thereto of an amount of heat insufficient to damage said casing and fibrous mass, and comprising the step of applying said amount of heat to said insulator after said bag has been introduced into said casing.]

[5. Method as claimed in claim 1 in which said fibrous material is selected from the group consisting of rock wool, silica fiber, ceramic fiber, and mixtures thereof.]

[6. Method as claimed in claim 1 in which said bag is made from a plastic selected from the group consisting of nylon, polyethylene, polypropylene, and combinations thereof.]

[7. Method as claimed in claim 1 in which the fibrous mass is caused to fill the space between inner and outer cylindrical casing encircling a passage for the gas exhausted from an automotive engine.]

*8. Method as claimed in claim 2 in which said bag is sealed in such a way that it may be unsealed by the application of an amount of heat insufficient to damage said fibrous mass and casing, and comprising the step of applying said amount of heat to said insulator after said bag has been introduced into said casing.*

*9. Method as claimed in claim 2 in which said bag is made of a material which is destroyed by the application thereto of an amount of heat insufficient to damage said casing and fibrous mass, and comprising the step of applying said amount of heat to said insulator after said bag has been introduced into said casing.*

*10. Method as claimed in claim 2 in which said fibrous material is selected from the group consisting of rock wool, silica fiber, ceramic fiber, and mixtures thereof.*

*11. Method as claimed in claim 2 in which said bag is made from a plastic selected from the group consisting of nylon, polyethylene, polypropylene, and combinations thereof.*

*12. Method of manufacturing a heat insulator which comprises the steps of wrapping a hermetically sealed bag about an inner casing to form an insert, said sealed bag containing a mass of fibrous material which has been compressed by vacuum-packing said fibrous material in the sealed bag; and then introducing said insert into an outer casing; and then unsealing said bag to permit said fibrous material to expand between the inner casing and the outer casing.*

*13. Method of manufacturing a heat insulator comprising the steps of:*

*I. wrapping a hermetically sealed bag about an inner cylindrical casing to form an insert, said sealed bag containing a mass of fibrous material which has been compressed by vacuum-packing it in said sealed bag, said sealed bag being made from a plastic selected from the group consisting of nylon, polyethylene, polypropylene and combinations thereof, and said fibrous material being selected from the group consisting of*

*rock wool, silica fiber, ceramic fiber and mixtures thereof; and then*

*II. introducing said insert into an outer cylindrical casing; and then*

*III. applying an amount of heat sufficient to destroy said sealed bag, the amount of heat being insufficient to damage said casing and fibrous material;*

*wherein, said mass of fibrous material is caused to fill the space between inner and outer cylindrical casing encircling a passage for the gas exhausted from an automotive engine.*

*14. Method of manufacturing a heat insulator comprising the steps of:*

*I. wrapping a hermetically sealed bag about an inner cylindrical casing to form an insert, said sealed bag containing a mass of fibrous material which has been compressed by vacuum-packing it in said sealed bag, said sealed bag being made from a plastic selected from the group consisting of nylon, polyethylene, polypropylene and combinations thereof, and said fibrous material being selected from the group consisting of rock wool, silica fiber, ceramic fiber and mixtures thereof; and then*

*II. introducing said insert into an outer cylindrical casing; and then*

*III. applying an amount of heat sufficient to unseal said sealed bag, the amount of heat being insufficient to damage said casing and fibrous material;*

*wherein said mass of fibrous material is caused to fill the space between inner and outer cylindrical casing encircling a passage for the gas exhausted from an automotive engine.*

* * * * *